United States Patent Office 3,438,995
Patented Apr. 15, 1969

3,438,995
DIAZAHETEROCYCLIC SUBSTITUTED BENZ-OXAHETEROCYCLIC COMPOUNDS
John Andrew Faust, Santa Ynez, and Melville Sahyun, Santa Barbara, Calif., assignors to Melville Sahyun, doing business as Sahyun Laboratories, Santa Barbara, Calif.
No Drawing. Continuation-in-part of application Ser. No. 466,430, June 23, 1965. This application Jan. 8, 1968, Ser. No. 696,145
Int. Cl. C07d 49/34, 51/28, 53/02
U.S. Cl. 260—309.6           15 Claims

ABSTRACT OF THE DISCLOSURE

Isochromans, phthalans and the corresponding thio compounds substituted at the 1-position by a 2-imidazolinyl, 2-tetrahydropyrimidinyl, or 2-tetrahydrodiazepinyl group. These compounds may be used as rubber accelerators, anti-oxidants, corrosion inhibitors, central nervous system depressants and anti-inflammatories.

---

This application is a continuation-in-part of application Ser. No. 466,430, filed June 23, 1965, now abandoned.

This invention relates to compositions of matter classified in chemistry as diazaheterocyclic substituted isobenzo-chalcogen-heterocyclics, more particularly isochromans, isothiochromans, phthalans and thiophthalans substituted at the 1-position by a 2-imidazolinyl, a 2-tetrahydropyrimidinyl or 2-tetrahydrodiazepinyl group, and to a process for their production.

The invention for which patent protection is sought resides in the concept of a composition of matter having the isobenzo-chalcogen-heterocyclic structure in which the ring chalcogen atom is of an atomic weight from 16 to 32 and is at the 2-position of a 5- to 6-member ring fused to a benzene ring in carbon chain molecular combination at the 1-position thereof with a monounsaturated diazaheterocyclic monocyclic ring containing from 3 to 5 ring carbon atoms by a ring carbon atom thereof bonded by a double bond to one ring nitrogen atom and by a single bond to the second ring nitrogen atom.

The novel structural feature of all the tangible embodiments of this invention is the molecular chemical combination of the tetrahydroisobenzopyran (isochroman), dihydroisobenzofuran (phthalan), tetrahydroisobenzothiopyran or dihydroisobenzothiofuran structure at the 1-position thereof with the imidazolinyl, tetrahydropyrimidinyl or tetrahydrodiazepinyl structure at the 2-position thereof.

The isochroman, isothiochroman, phthalan and thiophthalan structures are known in the art. See German Patents 614,461, 915,811 and 924,387; Elderfield, "Heterocyclic Compounds" (1951), volume 2, pages 82 and 544, Wiley publisher. Because of the fact the oxygen atom of the isochromans and phthalans are aralkoxy in contradistinction to the phenolic type oxy atom of the chromans and dihydrobenzofurans, the two classes of compounds have distinctly different types of physical and physiological properites.

There are many compounds known in the art having a tetrahydropyrimidinyl, tetrahydrodiazapinyl or imidazolinyl structure. However, none are known in which such diazaheterocyclic structures are joined by the 2-position carbon atom to the 1-position carbon atom of an isobenzo-chalcogen-heterocyclic structure.

The tangible embodiments of the composition aspect of this invention, in both their free base and acid addition forms, are intermediates in the production of the corresponding thioated compounds by reaction with carbon disulfide, and have the inherent applied use characteristic of exhibiting pharmacological activity, including central nervous system depressant and anti-inflammatory activities.

The compounds of this invention can be used as rubber accelerators. They can also be used as intermediates for the production of the corresponding thioated compounds, i.e., the corresponding thioated imidazolinyl, tetrahydropyrimidinyl and tetrahydrodiazepinyl substituted isobenzo chalcogen-heterocyclic compounds, which can be used as anti-oxidants, e.g., in plastic coatings and films, and as corrosion inhibitors, by reaction with carbon disulfide in an inert solvent at between room temperature and 100° C. At higher dose levels, e.g., single oral dose levels of 100 to 500 mg./kg., they are pesticides, e.g., against rats, mice and other rodents, when mixed with food attractive thereto, and ingested by the animal, causing death by lethal depression of the central nervous system. At lower dose levels, e.g., 1 mcg./kg. to 100 mcg./kg. IM or IP or 1.5 to 25 mg./kg. orally every 4–8 hours, they possess central nervous system depressant activity, as evidenced in male mice in one or more of the standard hexobarbital potentiation, anti-maximal electroshock and metrazol antagonism laboratory tests. At such lower dose levels they can be used to reduce or ameliorate the symptoms manifested by a central nervous system in an abnormal state of stimulation. At higher but non-toxic levels, they can be used as taming agents in wild or domestic animals for ease of handling and transportation. Administered topically, e.g., as a 0.25 to 5 percent cream, they possess anti-inflammatory activity, which manifests itself in the carrageenan edema standard anti-inflammatory test in rats in which the test compound is administered locally as part of the injection of the carrageenan irritant in a foot of the rat or orally one hour before the carrageenan injection, the weight difference between the injected inflammed foot and the opposite foot being the measure of the inflammatory edema and the reduction in inflammatory edema when the carrageenan is administered in conjunction with the test compound being a measure of the anti-inflammatory activity of the test compound.

The diazaheterocyclic ring preferably is attached directly to the 1-position ring carbon atom of the benzochalcogen-heterocyclic ring but can be separated by a carbon chain containing 1–2 carbon atoms. 2-imidazoline is the preferred of the diazaheterocyclic structurees and isochroman is the preferred of the isobenzo-chalcogen-heterocyclic structures. In the most active and preferred compounds, the imidazoline ring is attached by the 2-position carbon atom directly to the 1-position carbon atom of the isochroman ring.

The term "lower," e.g., when used in "lower-alkyl," means containing up to eight carbon atoms.

Because novelty and utility of the compounds are the result of the molecular chemical combination of the isobenzo-chalcogen-heterocyclic structure in combination with the diazaheterocyclic structure, embraced within the scope of the compounds having this structural combination are those having one or more, usually not more than a total of four and preferably not more than three, simple substituents on one or more of the benzenoid, chalcogen-heterocyclic and diazaheterocyclic rings. Those which can be on the benzenoid ring include halo, e.g., chloro, bromo and fluoro, lower-alkyl including methyl, ethyl, propyl and octyl, trifluoromethyl, lower-alkoxy including methoxy and ethoxy, and hydroxy. Others, less preferred, include aryloxy and aralkoxy including benzyloxy and phenoxy, lower-acyloxy including acetoxy, propoxy and benzoxy, carbo-lower-alkoxy including carbethoxy and carbomethoxy, nitro, and acetamido. The single bonded nitrogen atom of the diazaheterocyclic ring can bear a hydrogen atom or can be substituted with, e.g., aralkyl of 7–12 carbon atoms including benzyl and phenethyl, lower-alkyl including methyl, ethyl, propyl, butyl, octyl, hydroxyalkyl, e.g., hydroxyethyl, hydroxyalkyleneoxyalkyl, e.g., hydroxyethyleneoxyethyl, and esters thereof including acyloxyalkyl, e.g., acetoxyethyl, acetoxypropyl, propionyloxyethyl, aminoalkyl, e.g., aminoethyl, methylaminoethyl, dimethylaminoethyl, diethylaminoethyl, pyrrolidinoethyl, piperidinoethyl, morpholinoethyl and the corresponding γ- and ω-amino-substituted propyl, butyl, etc. The carbon atoms of the diazaheterocyclic ring can be substituted by hydroxy or lower-alkyl. The ring carbon atoms of the benzoheterocyclic ring can be substituted by lower-alkyl and, in the case of the 1-position carbon atom, also by lower-alkenyl, e.g., allyl and propargyl, cycloalkyl, e.g., cyclopropyl, cyclopentyl, cyclohexyl and cycloheptyl, aralkyl of 7–12 carbon atoms, e.g., benzyl and phenethyl, or lower-alkoxy, e.g., methoxy and ethoxy.

Preferably, so that the activity of the compounds is predominantly that resulting from the novel combination of the isobenzo-chalcogen-heterocyclic structure and diazaheterocyclic structure, the sum of the molecular weight of these substituents is less than 200 and more preferably less than 100, so that the resulting compound has a total molecular weight of less than 500, preferably less than 400, in free base form.

One preferred sub-class of compounds of this invention are those of a molecular weight less than 400 in free base form and having the formula

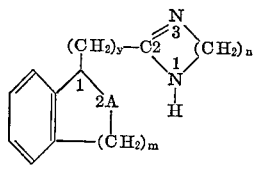

wherein A is a chalcogen having an atomic weight from 16 to 32, m is 1 or 2, preferably 2; y is 0 to 2, preferably 0; and n is 2 to 4, preferably 2; including those substituted on the benzenoid ring by lower-allyl, hydroxy, halo or trifluoromethyl; those substituted on the chalcogen-heterocyclic ring by lower-alkyl and at the 1-position, also lower-alkoxy, cycloalkyl of 3–7 carbon atoms or aralkyl of 7–12 carbon atoms; those substituted on a carbon atom of the azaheterocyclic ring by lower alkyl or hydroxy; and those substituted on the 1-position single bonded nitrogen atom by lower-alkyl and hydroxy-lower-alkyl.

Of the above, preferred are those of the formula

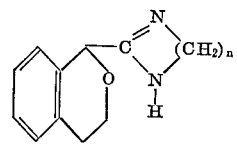

including those substituted on the benzenoid ring by lower-alkyl preferably methyl, hydroxy, and halo, preferably chloro or bromo, or trifluoromethyl, those substituted on the 1-position of the oxaheterocyclic ring by lower-alkyl, and those in which the 1-position single bonded nitrogen atom is substituted by lower-alkyl or hydroxy-lower-alkyl.

The compounds of this invention can exist in their free base and acid addition salt forms. The acid-addition salt form of the compounds of this invention can be prepared in the conventional manner by reacting the free base form of the compounds of this invention with an inorganic acid, for example, hydrochloric, hydrobromic, hydriodic, sulfuric, and phosphoric, or an organic acid, for example, acetic, hydroxyacetic, lactic, tartaric, glycolic, citric, tannic, commonly used for this purpose. These salts are convenient forms for the isolation and purification of the compounds of this invention and, with respect to the pharmaceutically acceptable, i.e., substantially non-toxic salts, for the administration of the compounds for the pharmacological purposes set forth herein. In these and other respects the acid addition salt form of the compounds of this invention is the equivalent of the free base form.

The following is a description of a method of making and using the tangible embodiments of this invention.

Ultraviolet light catalyzed bromination with bromine of an isochroman or phthalen (I) produces the corresponding 1-bromo compound (II) which, when reacted with a metal cyanide, is converted to the 1-cyano compound (III). Reaction of the cyano compound with the p-toluenesulfonate salt of an α,ω-alkylenediamine according to the procedure of J.C.S., (1947) 497, or with an α,ω-alkylenediamine in the presence of hydrogen sulfide produces the corresponding 1-(2-diazaheterocyclic)-substituted compound (IV). These reactions are illustrated by the following formulae, starting with unsubstituted isochroman and phthalan.

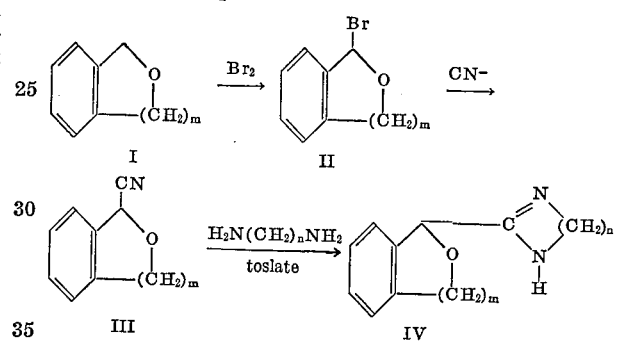

wherein m is 1 or 2 and n is 2 to 4.

The cyano compound (III) has an activated 1-position and can be readily converted to sodio derivatives, e.g., with sodamide. These sodio compounds can be converted to a wide variety of 1-substituted compounds with the appropriate chloro or bromo compound. These reactions are illustrated by the following formulae:

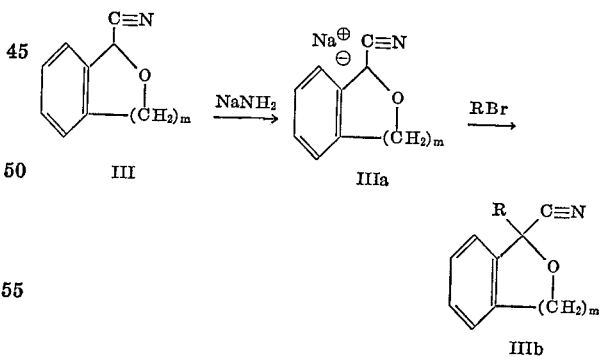

wherein R is lower-alkyl, lower-alkenyl, cycloalkyl or aralkyl. The 1-lower-alkoxy compounds are prepared by brominating the 1-cyano compound (III) to produce the corresponding 1-bromo-1-cyano compound which is converted with a sodium or potassium lower-alkoxide to the 1-lower-alkoxy-1-cyano compound which, in turn, is converted with an alkylenediamine to a 1-lower-alkoxy-1-diazaheterocyclic compound of this invention.

The oxaheterocyclic ring can bear alkyl groups elsewhere by appropriate choice of starting materials.

The starting isochromans can be prepared by several methods, e.g. by the cyclization of a β-phenethyl alcohol and formaldehyde or an orthomethylol-substituted phenethyl alcohol with acid. The latter compounds can be prepared by the lithium aluminum hydride reduction of a diester of a homophthalic acid. The latter route is preferred where a substituent on the benzene ring would interfere with the formaldehyde cyclization reaction.

The starting phthalans can be prepared by the reaction of o-xylylene dibromide with alkali. See Willstater et al., Ber., 40, 965 (1907). The Grignard reaction with excess lower-alkyl magnesium halide and a phthalid can be used to produce 1,1-di-lower-alkylphthalans whose lower-alkyl groups will be at the 3-position of the compounds of this invention. See Ludwig, Ber., 40, 3060 (1907). Limited amounts of the Grignard reagent produces the monoalkyl-hydroxy compound which dehydrates spontaneously to the α-alkylene compound. See Mermod et al., Ber., 41, 983 (1908). Low pressure hydrogenation with a conventional platinum or palladium on charcoal catalyst gives 1-lower-alkyl-phthalans. Lower-alkyl Grignard reagents reacted with phthalaldehyde gives 1,3-di-lower-alkyl-phthalans. Nelken et al., Ber., 41, 986 (1908).

It will be apparent from the above description that by the choice of appropriate starting materials, isochromans and phthalans can be prepared bearing one or more substituents on the benzene ring. Thus 2-(7-chloro-1-isochromanyl)-2-imidazoline, 2-(8-methyl-1-isochromanyl)-2-imidazoline, 2-(5,8 - dimethyl - 1 - isochromanyl)-2-imidazoline, 2-(7-trifluoromethyl - 1 - isochromanyl)-2-imidazoline, and 2-(7-methoxy-1-isochromanyl)-2-imidazoline are prepared, respectively, from 2-methylol-4-chloro-phenethyl alcohol, 2-methylol-3-methyl-phenethyl alcohol, 2-methylol-3,6-dimethyl-phenethyl alcohol, 2-methylol-4-trifluoromethyl-phenethyl alcohol and 2-methylol-4-methoxy-phenethyl alcohol.

Similarly, 2-(1-phthalanyl)-2-imidazoline, 2-(5-chloro-1-phthalanyl) - 2 - imidazoline, 2 - (5 - trifluoromethyl-1-phthalanyl)-2-imidazoline, 2 - (5-methoxy-1-phthalanyl)-2-imidazoline, and 2-(5-hydroxy-1-phthalanyl)-2-imidazoline, are prepared, respectively, by the reaction of sodium methoxde or potassium hydroxide with o-xylylene dibromide, p-chloro-o-xylylene dibromide, p-trifluoromethyl-o-xylylene dibromide, p-methoxy-o-xylylene dibromide, and p-hydroxy-o-xylylene dibromide. Alternatively, p-benzyloxy-o-xylylene dibromide can be converted to 5-benzyloxy-phthalan and the benzyl group removed by hydrogenation to give the 5-hydroxyphthalan starting material.

The above description relates to the production of isochromans and phthalans in which the diazaheterocyclic ring is attached by a ring carbon atom directly to the ring carbon atom of the isobenzoxaheterocyclic ring. Those in which the two rings are separated by one carbon atom are prepared, e.g., by brominating a 1-unsubstituted isochroman in the cold in the presence of ultraviolet light. The intermediately produced 1-bromo-isochroman spontaneously rearranges to an o-(β-bromoethyl)benzaldehyde. Reaction of this compound with ethyl bromoacetate and zinc produces the corresponding ethyl 3-hydroxy-3-o-(β-bromoethyl)-phenylpropionate which is converted, with base to a 1-isochromanylacetic acid which, in turn, can be converted by conventional procedures to the corresponding 1-isochromanylcarbonitrile. The 1-isochromanylcarbonitriles can be converted to 1-(2'-diazaheterocyclicmethylene)-isochromanes in the same manner as the 1-cyano-isochromanes.

It will be apparent the above described reactions for producing the isochromans and phthalans of this invention can also be employed to produce the corresponding isothiochromans and thiophthalans, starting with the appropriate starting materials, e.g., by reaction of a 1-chloroisochroman or 1-chlorophthalan with mercuric cyanide followed by reaction of the thus produced 1-cyano compound with an α,ω-alkylenediamine.

The foregoing discussion is offered to illustrate methods suitable for the practice of our invention and not to limit its scope. The invention is further illustrated by the following examples. (All temperatures are reported in degrees centigrade.)

Example 1.—2-(1-isochromanyl)-2-imidazoline hydrochloride (a) Hydrogen chloride was bubbled through a stirred mixture of 244 g. (2 moles) of β-phenylethyl alcohol and 75 g. (2.5 moles) of paraformaldehyde, maintained at 0–10°, until the mixture became homogeneous. The paraformaldehyde gradually dissolved to form two layers which subsequently merged. Some of the excess hydrogen chloride was removed under vacuum after which 500 ml. of 20 percent sodium hydroxide was added. The mixture was stirred under reflux for one hour, cooled and the upper layer was isolated, dried and distilled. Yield, 250 g. of isochroman, B.P. 100–103° (19 mm.).

(b) A stirred solution of 100 g. (0.75 mole) of isochroman in 400 ml. of carbon tetrachloride at 10° was illuminated with a U.V. lamp and treated dropwise with a solution of 120 g. (0.75 mole) of bromine in 200 ml. of carbon tetrachloride. The addition required about three hours after which the mixture was distilled at a temperature below 30° to remove the solvent. See Ber., 89, 1254 (1956).

(c) A mixture of 100 g. (0.47 mole) of 1-bromo-isochroman, 57 g. (0.64 mole) of cuprous cyanide and 400 ml. of toluene was stirred under reflux for 16 hours, after which it was filtered and fractionated. The yield of colorless oil which solidified was 62 g. (63 percent) of 1-cyanoisochroman, B.P. 93–95° (0.4 mm.). See Chem. Abst., 49, 6931 (1955).

(d) A mixture of 6.4 g. (0.04 mole) of 1-cyanoisochroman and 10 g. (0.041 mole) of ethylenediamine mono-p-toluenesulfonate, prepared according to the procedure of J.C.S. (1947), 497, was heated at 140–150° under an atmosphere of nitrogen until the evolution of ammonia ceased (about 2 hours). The cooled reaction product was dissolved in water, the solution was made alkaline with sodium hydroxide, and the precipitated solid base was isolated. It was purified by dissolving in dilute acid, treating with charcoal and adding a slight excess of alkali. The solution remained clear for a few moments before the base separated as fragile colorless blades. Yield, 3.5 g. (43%) of 2-(1-isochromanyl)-2-imidazoline hydrochloride, M.P. 121–123°.

*Analysis.*—Calculated for $C_{12}H_{14}N_2O$: Neut. equiv., 202. Found: Neut. equiv., 205.

The hydrochloride salt, prepared by dissolving the base in excess ethanolic hydrogen chloride and removing the solvent, melted at 230–232° (dec.) after recrystallization from isopropyl alcohol-ether:

*Analysis.*—Calculated for $C_{12}H_{14}N_2O \cdot HCl$: N, 11.74; Cl−, 14.85. Found: N, 11.51; Cl−, 14.55.

Example 2.—2-(1-isochromanyl)-1,4,5,6-tetrahydropyrimidine hydrochloride

A mixture of 6.4 g. (0.04 mole) of 1-cyanoisochroman (Example 1a), 8.6 g. (0.02 mole) of 1,3-diaminopropane bis-tosylate, (prepared by combining molecular equivalents of 1,3-diaminopropane and mono-p-toluenesulfonic acid in isopropyl alcohol and removing the solvent), and 1.7 g. (0.02 mole) of 1,3-diaminopropane was heated at 140–150° for 2 hours under nitrogen. The cooled reaction mixture was dissolved in water, the solution was treated with decolorizing charcoal and made alkaline with dilute sodium hydroxide. The oily base which separated was extracted with ether and the dried ether extract was treated with ethereal hydrogen chloride. The precipitated hydrochloride salt was recrystallized from isopropyl alcohol-ether. Yield, 6 g. (60%) of 2-(1-isochromanyl)-1,4,5,6-tetrahydropyrimidine hydrochloride, M.P., 236–237° (dec.).

*Analysis.*—Calculated for $C_{13}H_{16}N_2O \cdot HCl$: N, 11.09; Cl−, 14.03. Found: N, 10.87; Cl−, 13.75.

Example 3.—2-[1-(1-butyl)isochromanyl]-2-imidazoline sulfate (a) A solution, prepared from 16 g. (0.1 mole) of 1-cyanoisochroman (Example 1a), 13.7 g. (0.1 mole) of n-butyl bromide and 100 ml. of benzene, was added dropwise to a stirred suspension of 4.3 g. (0.1 mole) of 90% sodium amide in 50 ml. of benzene. The mixture was stirred under reflux for an additional 1.5 hours after which water was added and the layers were separated. The benzene layer was fractionated to yield 13.3 g. (62%) of 1-butyl-1-cyanoisochroman, B.P. 118–120° (0.7 mm.), which crystallized upon standing.

*Analysis.*—Calculated for $C_{14}H_{17}NO$: N, 6.52. Found: N, 6.49.

(b) A mixture of 10.8 g. (0.05 mole) of 1-butyl-1-cyanoisochroman and 12 g. (0.05 mole) of ethylenediamine mono-tosylate was heated, under nitrogen, at 165° for 3.5 hours. The resulting viscous oil was partitioned between dilute hydrochloric acid and ether, and the aqueous layer was made alkaline. The oily base was extracted with ether, the ether extract was washed, dried and fractionated. There was obtained 4.6 g. (36%) of 2-[1-(1-butyl)isochromanyl]-2-imidazoline as a viscous oil which, upon redistillation, boiled at 150–152° (0.3 mm.).

*Analysis.*—Calculated for $C_{16}H_{22}N_2O$: N, 10.85; neut. equiv., 258. Found: N, 10.85; neut. equiv., 266.

The sulfate acid addition salt was prepared in ether and recrystallized from isopropyl alcohol ether from which it separated as pale pink crystals, M.P. 175–177°, which were sensitive to air and light.

*Analysis.*—Calculated for $C_{16}H_{22}N_2O \cdot H_2SO_4$: N, 7.86; $SO_4^=$, 26.95. Found: N, 7.64; $SO_4^=$, 26.92.

Example 4.—1-butyl-2-(1-isochromanyl)-1,4,5,6-tetrahydropyrimidine

A mixture of 6 g. (0.0375 mole) of 1-cyanoisochroman, 2.5 g. (0.019 mole) of N-butyl-1,3-diaminopropane and 9 g. (0.019 mole) of N-butyl-1, 3-diaminobutane bis-tosylate was heated under nitrogen at 150–160° for 3 hours. The bis-tosylate was prepared by the interaction of two molar equivalents of p-toluene sulfonic acid and one molar equivalent of n-butyl-1,3-diaminopropane in isopropanol and melted at 128–129° after recrystallization from isopropyl alcohol-ether. The resulting mixture was partitioned between ether and dilute sodium hydroxide, and the ether solution was then extracted with dilute hydrochloric acid. The acidic aqueous layer was rendered alkaline and extracted with ether. The ether extract was washed, dried and fractionated to yield 4.4 g. (43%) of 1-butyl-2-(1-isochromanyl)-1,4,5,6-tetrahydropyrimidine as a pale yellow viscous oil, B.P. 165–167° (0.8 mm.).

*Analysis.*—Calculated for $C_{17}H_{24}N_2O$: N, 10.27; neut. equiv., 272. Found: N, 10.31; neut. equiv., 275.

Example 5.—5-hydroxy-2-(1-isochromanyl)-1,4,5,6-tetrahydropyrimidine hydrochloride A mixture of 7 g. (0.044 mole) of 1-cyanoisochroman, 9.5 g. (0.022 mole) of 1,3-diamino-2-propanol bis-tosylate and 2 g. (0.022 mole) of 1,3-diamino-2-propanol was heated under nitrogen at 150–160° for 1 hour. The bis-tosylate was prepared from one mole of commercial 1,3-diamino-2-propanol by the action of two moles of p-toluenesulfonic acid in ethanol and melted at 272–273° after recrystallization from isopropyl alcohol. The solid mass was recrystallized from ethanol to obtain 13 g. (73%) of the mono-p-toluenesulfonate salt of 5-hydroxy-2-(1-isochromanyl) - 1,4,5,6 - tetrahydropyrimidine, M.P. 192–193°.

*Analysis.*—Calculated for $C_{13}H_{16}N_2O_2 \cdot C_7H_8O_3S$: N, 6.93. Found: N, 6.71.

The tosylate was dissolved in an excess of ethanolic hydrogen chloride, and the solution was diluted with ether to precipitate the hydrochloride as white granules, M.P. 263–264°.

*Analysis.*—Calculated for $C_{13}H_{16}N_2O_2 \cdot HCl$: N, 10.43; $Cl^-$, 13.19. Found: N, 10.12; $Cl^-$, 13.46.

Example 6.—1-hydroxymethyl-2-(1-isochromanyl)-2-imidazoline hydrochloride

To a solution of 5 g. (0.025 mole) of 2-(1-isochromanyl)-2-imidazoline (Example 1d) in 25 ml. of ethanol was added 2.5 ml. of 37% formaldehyde. The homogeneous solution was allowed to remain at 25° for 24 hours after which the solvent was removed, and the residue was dried by azeotropic distillation with isopropyl alcohol. The oily residue was dissolved in ethanolic hydrogen chloride, and the solution was diluted with ether. The solid 1-hydroxymethyl-2-(1-isochromanyl)-2-imidazoline hydrochloride which separated weighed 2.5 g. (37%) and melted at 221–222°.

*Analysis.*—Calculated for $C_{13}H_{16}N_2O_2 \cdot HCl$: N, 10.43; $Cl^-$, 13.19. Found: N, 10.34; $Cl^-$, 13.33.

Example 7.—1-(2-hydroxyethyl)-2-(1-isochromanyl)-1,4,5,6-tetrahydropyrimidine

A mixture of 6 g. (0.0375 mole) of 1-cyanoisochroman, 8.8 g. (0.019 mole) of the bis-tosylate salt of N-($\beta$-hydroxyethyl)-1,3-diaminopropane and 2.3 g. (0.019 mole) of the corresponding base of this salt was heated at 145° for 2.5 hours. The reaction product was dissolved in water, the solution was made alkaline and the insoluble material was extracted with chloroform. Removal of the chloroform yielded the crude solid base which was recrystallized from a mixture of isopropyl alcohol and heptane to give 5 g. (51%) of 1-(2-hydroxyethyl)-2-(1-isochromanyl)-1,4,5,6-tetrahydropyrimidine, M.P. 156–158°.

*Analysis.*—Calculated for $C_{15}H_{20}N_2O_2$: N, 10.76; neut. equiv., 260. Found: N, 10.78; neut. equiv., 268.

Example 8.—2-(1-isochromanyl)-4-methyl-1,4,5,6-tetrahydropyrimidine hydrochloride A solution consisting of 6 g. (0.0375 mole) of 1-cyano-iso-chroman and 3.3 g. (0.0375 mole) of 1,3-diaminobutane was treated with hydrogen sulfide until approximately 300 mg. had been absorbed, after which the solution was heated at 145° for 2 hours. The cooled mass was partitioned between dilute hydrochloric acid and ether, and the aqueous layer was made alkaline. The oily base was extracted with ether and distilled to give 2.5 g. of 2-(1-isochromanyl)-4-methyl-1,4,5,6-tetrahydropyrimidine, B.P., 147–153° (0.2 mm.). The hydrochloride, prepared in ether with hydrogen chloride, melted at 243–245° (dec.) after recrystallization from isopropyl alcohol-ether.

*Analysis.*—Calculated for $C_{14}H_{18}N_2O \cdot HCl$: N, 10.50; $Cl^-$, 13.29. Found: N, 10.33; $Cl^-$, 13.52.

Example 9.—1-(2-aminoethyl)-2-(1-isochromanyl)-2-imidazoline dihydrochloride

A spontaneous reaction occurred when a small amount of hydrogen sulfide was passed into a mixture of 6 g. (0.0375 mole) of 1-cyano-isochroman and 3.9 g. (0.0375 mole) of diethylenetriamine. The mixture was heated at 140° for 30 minutes to complete the reaction, after which the cooled reaction mixture was partitioned between dilute hydrochloric acid and ether. The aqueous solution was made alkaline and the liberated base was extracted with chloroform. The extract was dried, acidified with ethereal hydrogen chloride and vacuum-distilled to remove the chlorofrom. Recrystallization of the residue from a mixture of alcohol and acetone gave 2.5 g. (21 percent) of 1-(2-aminoethyl)-2-(1-isochromanyl)-2 - imidazoline dihydrochloride, M.P. 283–285° (dec.).

*Analysis.*—Calculated for $C_{14}H_{19}N_3O \cdot 2HCl$: N, 13.17; $Cl^-$, 22.28. Found: N, 13.18; $Cl^-$, 22.22.

Example 10.—2-(1-isochromanyl)-1-methyl-2-imidazoline

A mixture of 6 g. (0.0375 mole) of 1-cyanoisochroman and 3 g. (0.4 mole) of N-methylethylenediamine, to which about 200 mg. of hydrogen sulfide had been added, was heated at 110° for 2 hours. The cooled mixture was treated with dilute hydrochloric acid and the insolubles were extracted with ether. The clear aqueous solution was made alkaline, and the liberated base was isolated by ether extraction and distilled. Yield, 1.7 g. (20 percent) of 2-(1-isochromanyl)-1 - methyl - 2 - imidazoline, B.P.

Example 11.—2-(1-isochromanyl)-4,5,6,7-tetrahydro-1,3-diazepine hydrochloride

A mixture of 5 g. (0.031 mole) of 1-cyanoisochroman, 2.7 g. (0.031 mole) of 1,4-diaminobutane and approximately 200 mg. of hydrogen sulfide was heated at 180–190° for 2 hours. Dilute hydrochloric acid was added to the cooled mass and the insolubles were extracted with ether. The aqueous solution was made alkaline, and the oily base was extracted with ether. The ether solution was washed repeatedly with water, dried and stripped to a viscous amber oil. The oily base was converted to its hydrochloride with ethereal hydrogen chloride, and the salt was recrystallized twice from a mixture of isopropyl alcohol and ether to give 0.7 g. (9 percent) of 2-(1-isochromanyl)-4,5,6,7-tetrahydro-1,3 - diazepine hydrochloride, M.P. 252–253°.

Analysis.—Calculated for $C_{14}H_{18}N_2O \cdot HCl$: N, 10.50; $Cl^-$, 13.29. Found: N, 10.29; $Cl^-$, 13.31.

Example 12.—2-(7-chloro-1-isochromanyl)-2-imidazoline (a) Homophthalic acid (Org. Syn., Coll. Vol. III, 449) was converted to 4-amino-homophthalic acid by nitration and reduction essentially as described in J.O.C. 10, 533 (1945). The reduction was in methanol at 25° and 50 p.s.i. using a platinum catalyst. The overall yield of recrystallized 4-aminohomophthalic acid was 44 percent; M.P. over 300°.

(b) A cold solution of the diazonium salt, prepared from 19.5 g. (0.1 mole) of 4-aminohomophthalic acid and 7 g. (0.1 mole) of sodium nitrite in hydrochloric acid, was added to a stirred solution of 12.4 g. (0.125 mole) of cuprous chloride in a mixture of 25 cc. of 36 percent hydrochloric acid and 10 cc. of water at 0°. After the initial foaming had subsided, the mixture was filtered and the solid dried. Yield, 16 g. (74 percent) of 4-chlorohomophthalic acid, M.P. 196–197° after recrystallization from either water or acetic acid.

Analysis.—Calculated for $C_9H_7ClO_4$: Equiv. wt., 107. Found: Equiv. wt., 106.

(c) A mixture of 60 g. (0.28 mole) of 4-chlorohomophthalic acid, 58 cc. of ethanol, 90 cc. of benzene and 0.5 cc. 98 percent sulfuric acid was refluxed under a water separator overnight. About 26 cc. of an aqueous alcohol phase had separated during the reaction period. The reaction mixture was stripped and the residue was partitioned between ether and dilute sodium bicarbonate. The ether layer was dried and distilled to give 23.3 g. (31 percent) of diethyl-4-chlorohomophthalate, B.P. 140–142° (0.8 mm.).

Analysis. — Calculated for $C_{13}H_{15}ClO_4$: Cl, 13.1. Found: Cl, 12.3.

(d) An ether solution of 23.2 g. (0.085 mole) of diethyl-4-chlorohomophthalate was added dropwise to a suspension of 3.8 g. (0.1 mole) of lithium aluminum hydride in ether. The addition caused the ether to reflux, and the mixture was stirred for 2 hours thereafter. Iced hydrochloric acid was added, the layers were separated and the ether layer distilled to a dry residue which was recrystallized from dilute methanol. Yield, 11.5 g. (72 percent) of 4-chloro-2-hydroxymethyl - beta - phenethyl alcohol, M.P. 75–76°.

Analysis.—Calculated for $C_9H_{11}ClO_2$: Cl, 19.0. Found: Cl, 19.1.

(e) A mixture of 11.4 g. (0.061 mole) of 4-chloro-2-hydroxymethyl-β-phenethyl alcohol and an equal volume of 85 percent phosphoric acid was stirred at 95–100° for 4 hours. The cooled mixture was made alkaline with dilute sodium hydroxide, and extracted with ether. Distillation of the dried ether extract yielded 4.9 g. (48 percent) of 7-chloroisochroman as a colorless liquid, B.P. 139–140° (24 mm.).

(f) To a solution of 4.9 g. (0.029 mole) of 7-chloroisochroman in carbon tetrachloride, which was illuminated with a U.V. lamp, was added dropwise a carbon tetrachloride solution of 4.8 g. of bromine. Decolorization was rapid. Removal of the solvent yielded 7.8 g. of crude 1-bromo-7-chloroisochroman melting at about 110–115° which was used without purification.

(g) All of the 1-bromo-7-chloro-isochroman was combined with 4.0 g. of cuprous cyanide in toluene, and the mixture was refluxed overnight. The cooled mixture was filtered, the solvent was removed and the solid residue was recrystallized from heptane. Yield, 3.8 g. of 7-chloro-1-cyanoisochroman, M.P. 112–114°.

Analysis. — Calculated for $C_{10}H_8ClNO$: N, 7.24. Found: N, 6.65.

(h) A mixture of 3.8 g. (0.02 mole) of 1-bromo-7-chloro-isochroman and 5.8 g. (0.025 mole) of ethylenediamine tosylate was heated at 200° for 2 hours. The dark reaction mixture was treated with dilute sodium hydroxide and extracted with several portions of ether. Removal of the ether left a dark oil which was extracted several times with boiling heptane. The dark solid which separated from the cooled heptane was dissolved in dilute hydrochloric acid, treated with charcoal and made alkaline. The precipitated solid was then recrystallized from heptane to give 0.3 g. of 2-(7-chloro-1-isochromanyl)-2-imidazoline, M.P. 119–121°.

Analysis.—Calculated for $C_{12}H_{13}ClN_2O$: N, 11.84; equiv. wt., 237. Found: N, 11.45; equiv. wt., 247.

Example 13.—2-[1-(1-butyl)isochromanyl]-1-methyl-2-imidazoline

Hydrogen sulfide was passed through a mixture of 10.5 g. (0.049 mole) of 1-butyl-1-cyanoisochroman (Example 3b) and 3.6 g. (0.049 mole) of N-methylethylenediamine until about 300 mg. had been absorbed. The resulting mixture was heated for 2 hours at 140°, cooled and partitioned between dilute hydrochloric acid and ether. The acidic aqueous layer was made alkaline and the liberated base was extracted with chloroform and distilled to give 2-[1-(1-butyl)isochromanyl]-1-methyl-2-imidazoline, B.P. 148–152° (0.3 mm.). The base was not completely soluble in dilute acid. The insoluble portion was extracted, the solution made alkaline and the liberated base distilled to give 2.4 g. as a viscous pale yellow oil, B.P. 142–144° (0.2 mm.).

Analysis.—Calculated for $C_{17}H_{24}N_2O$: N, 10.29; neut. equiv. 272. Found: N, 10.64; neut. equiv., 274.

Example 14.—2-[1-(3-hydroxypropyl)-1-isochromanyl]-2-imidazoline (a) A benzene solution containing 8 g. (0.05 mole) of 1-cyanoisochroman and 9 g. (0.05 mole) of tetrahydropyran-2-yl 3-chloropropyl ether [J. Am. Chem. Soc., 70, 4187 (1948)] was added dropwise to a stirred, refluxing suspension of 2.7 g. (0.07 mole) of powdered sodium amide in benzene. After being stirred under reflux for an additional 1.5 hours the mixture was cooled, filtered and fractionated. Yield, 8.3 g. of tetrahydropyran-2-yl-3-(1-cyanoisochroman-1-yl)propyl ether, B.P. 188–190° (0.5 mm.).

Analysis.—Calculated for $C_{18}H_{23}NO_3$: N, 4.65. Found: N, 4.26.

(b) A mixture of 4.9 g. (0.016 mole) of tetrahydropyran-2-yl 3-(1-cyanoisochroman-1-yl)propyl ether and 1 g. of ethylene diamine was treated with a small amount of hydrogen sulfide and heated at 120° for 2 hours. Dilute hydrochloric acid was added to the cooled reaction mixture and the insoluble material was extracted with ether. The aqueous solution was made strongly alkaline and extracted with chloroform. The oil remaining after the removal of the chloroform was extracted with hot heptane from which the 2-[1-(3-hydroxypropyl)-1-isochromanyl]-2-imidazoline separated as a white powder. Yield, 0.7 g.; M.P. 140–141°.

*Analysis.*—Calculated for $C_{15}H_{20}N_2O_2$: N, 10.76; neut. equiv., 260. Found: N, 10.94; neut. equiv., 265.

Following the procedures of Examples 1–5, 7–11 and 14, using 1-cyanophthalan instead of 1-cyanoisochroman, the corresponding phthalan products are produced.

Example 15.—2-(isochroman-1-yl methyl)-2-imidazoline sulfate (a) A solution of 160 g. (1 mole) of bromine in carbon tetrachloride was added dropwise to a stirred solution of 134 g. (1 mole) isochroman in carbon tetrachloride which was cooled in ice and illuminated with a U.V. lamp. The rate of addition was regulated so that each drop was decolorized before the next drop was added. The solvent was removed under reduced pressure. The residue, which appears to consist largely of 1-bromoisochroman, was distilled. There was obtained 180 g. of essentially pure o-(β-bromoethyl)benzaldehyde as an oil, B.P. 90–92° (0.3 mm.).

(b) A solution containing 14.7 g. (0.088 mole) of ethyl bromoacetate and 18.6 g. (0.087 mole) of o-(β-bromoethyl)benzaldehyde in approximately 200 ml. of dry ether was added dropwise to a stirred, refluxing mixture of 10 g. (0.15 mole) of clean zinc powder and 20 ml. of dry ether. The addition was made over a period of one hour after which refluxing was continued for an additional 4 hours. The ether solution was decanted from the remaining zinc into a mixture of ice and hydrochloric acid. The ether layer was washed with water and dilute sodium bicarbonate, dried and distilled to remove the ether. The residue was solid ethyl 3-hydroxy-3-o-(β-bromoethyl)-phenylpropionate weighing 22 g. (85%) and melting at 64–65° after recrystallization from methanol.

*Analysis.*—Calculated for $C_{13}H_{17}BrO_3$: Br, 26.5. Found: Br, 25.6.

(c) A solution of 20 g. of the crude ethyl 3-hydroxy-3-o-(β-bromoethyl)-phenylpropionate in methanol was combined with 12 g. KOH and the mixture was refluxed for one hour. The residue remaining after the removal of the solvent was dissolved in water and the solution was acidified. The oil which separated was extracted with chloroform and distilled. Yield, 10.5 g. (83%) of 1-isochromanylacetic acid, B.P. 155–157° (0.4 mm.); M.P. 69–71° after recrystallization from heptane.

*Analysis.*—Calculated for $C_{11}H_{12}O_3$: Neut. equiv., 192. Found: Neut. equiv., 195.

(d) Gas evolution occurred when 7.5 g. (0.039 mole) of 1-isochromanylacetic acid was combined with 30 ml. of thionyl chloride. After one hour at 25°; the solution was refluxed one hour and stripped. The residual oil was added to ice-ammonium hydroxide and the resulting oil was extracted with chloroform. Removal of the chloroform left an oil which slowly solidified. Yield 7.3 g. (97 percent) of 1-isochromanylacetamide, M.P. 109–110° after recrystallization from heptane.

*Analysis.*—Calculated for $C_{11}H_{13}NO_2$: N, 7.33. Found: N, 7.00.

(e) A mixture of 17.2 g. (0.09 mole) of 1-isochromanylacetamide, 80 ml. of thionyl chloride and 100 ml. of chloroform was refluxed for 14 hours and distilled. The fraction boiling at 124–126° (0.3 mm.) and weighing 10.8 g. (68 percent) was 1-isochromanylcarbonitrile.

*Analysis.*—Calculated for $C_{11}H_{11}NO$: N, 8.09. Found: N, 7.56.

(f) Hydrogen sulfide was passed briefly through a mixture of 3 g. (0.017 mole) of 1-isochromanylcarbonitrile and 1.3 g. (0.22 mole) of ethylene diamine, and the warm mixture was heated in an oil bath at 115° for 45 minutes. During this time there was a brisk evolution of ammonia and the mixture became quite dark. It was cooled, treated with dilute hydrochloric acid, filtered through charcoal and made alkaline. The liberated base was extracted repeatedly with ether and the dried ether solution was distilled. The base distilled at approximately 160 (0.35 mm.) as a viscous yellow oil. It was converted to the sulfate salt by treatment with an excess of sulfuric acid in ether, and the salt was recrystallized twice from a mixture of methanol-ether. Yield, 0.35 g. of 2-(isochroman-1-yl methyl)-2-imidazoline sulfate, M.P. 157–158°.

*Analysis.*—Calculated for $C_{13}H_{16}N_2O \cdot H_2SO_4$: N, 8.91; $SO_4^=$, 30.56. Found: N, 8.64; $SO_4^=$, 29.99.

Example 16.—2-(1-isothiochromanyl)-2-imidazoline hydrochloride (a) A mixture of 75 g. (0.56 mole) of isochroman, 600 ml. of 48 percent hydrobromic acid and 400 ml. of glacial acetic acid was refluxed for six hours and cooled. The layers were separated, the aqueous layer was extracted with ether and the ether extract was combined with the organic layer. After washing with dilute sodium bicarbonate and drying, the solution was distilled to yield 66 g. (42 percent) of the known o-(2-bromoethyl)benzyl bromide, B.P. 124–126° (1.3 mm.). C.A. 51, 3581 (1957).

(b) To a stirred, refluxing mixture of 57 g. (0.22 mole) of sodium sulfide nonahydrate, 150 ml. of isopropyl alcohol and 150 ml. of water there was added, dropwise during 45 minutes, a solution of o-(2-bromoethyl)benzyl bromide in 150 ml. of acetone. After being stirred and refluxed for an additional 4 hours, the organic solvent was removed by distillation and the residual solution was steam distilled. The distillate was extracted with ether and the ether was washed, dried and distilled to yield 11 g. (73 percent) of isothiochroman as a colorless liquid, B.P. 130–135° (19 mm.). Reported B.P. 128–130° (13 mm.). C.A. 18, 830.

(c) Following essentially the procedure described in Ber. 97, 179 (1964), eleven g. (0.074 mole) of isothiochroman in 50 ml. of carbon tetrachloride was cooled to approximately —20° C., and treated dropwise during 30 minutes with a solution of 5.3 g. (0.075 mole) of chlorine in carbon tetrachloride. Removal of the solvent at 20° left the crude 1-chloroisothiochroman as a thin liquid containing a small amount of viscous oil. It was used without purification.

(d) When the crude 1-chloroisothiochroman was added to a mixture of 12 g. of mercuric cyanide and 10 g. of cuprous cyanide, an exothermic reaction occurred which caused the temperature to rise to 30°. Benzene was added immediately and the mixture was stirred under reflux for 2 hours. The mixture was filtered and the filtrate distilled. There was obtained 4.2 g. of 1-cyanoisothiochroman, B.P. 115–121° (0.25 mm.), which solidified and melted at 66–67° after recrystallization from heptane. Reported B.P. 122° (0.1 mm.); M.P. 63–64°. Arch. Pharm. 297 (6), 325; C.A. 61, 8265.

(e) Hydrogen sulfide was bubbled briefly through a mixture of 4.2 g. (0.024 mole) of 1-cyanoisothiochroman and 1.8 g. (0.03 mole) of ethylene diamine after which the mixture was heated at 90–100° for two hours. Ammonia was evolved during this time and the mixture became quite dark. The cooled mass was taken up in warm dilute hydrochloric acid and filtered through charcoal. The dark solution was made alkaline, extracted with chloroform, and the chloroform was removed. The residual oil (4 g.) was dissolved in ethanol containing a slight excess of hydrogen chloride and the solution was diluted with ether. The buff-colored solid 2-(1-isothiochromanyl)-2-imidazoline hydrochloride, which separated weighed 3 g. and melted at 226–228° (dec.) after several recrystallizations from methanol-ether which only incompletely removed the color despite the liberal use of charcoal.

*Analysis.*—Calculated for $C_{12}H_{14}N_2S \cdot HCl$: N, 11.00. Found: N, 10.52.

When the compositions of this invention are used as pharmaceuticals, they can be administered orally in the form of pills, tablets, capsules, e.g., in admixture with talc, starch, sugar, milk sugar, or other inert, i.e., non-toxic or pharmacologically acceptable pharmaceutical carrier, or in the form of aqueous solutions, suspensions, encapsulated suspensions, gels elixirs, aqueous alcholic solutions, e.g., in admixture with sugar or other sweetening agent, flavorings, colorants, thickeners and other conventional pharmaceutical excipients. When injected subcutaneously, intravenously or intramuscularly, usually the latter, they can be administered, e.g., as an aqueous or peanut oil solution or suspension using excipients and carriers conventional for this mode of administration. The best route of administration and the best dosage will be apparent from the laboratory tests for activity and toxicity of the selected compound conventionally undertaken as part of the development phase of a pharmaceutical.

For topical administration the compounds can be formulated in 0.25 to 5 percent creams, lotions, ointments, salves using conventional excipients to form these vehicles. They can also be mixed with talc, etc. to form powders for dry topical application or combined with propellants to form sprays for topical application or inhalation.

What is claimed is:

1. A compound of the group consisting of (a) those of the formula

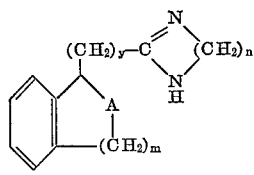

wherein A is a chalcogen of an atomic weight from 16 to 32, $m$ is an integer from 1 to 2, $y$ is an integer from 0 to 2 and $n$ is an integer from 2 to 4; and (b) those of the above formula bearing at least one substituent on at least one of the benzenoid, chalcogen-heterocyclic and azaheterocyclic rings and selected, when on the benzenoid ring, from the group consisting of lower-alkyl hydroxy, halo, and —$CF_3$; when on the chalcogen-heterocyclic ring, from the group consisting of lower-alkyl and, when at the 1-position, also lower-alkoxy, lower-alkenyl, cycloalkyl of 3–7 carbon atoms and phenyllower-alkyl; when on a carbon atom of the azaheterocyclic ring from the group consisting of lower-alkyl and hydroxy; and when on the nitrogen atom of the azaheterocyclic ring from the group consisting of lower-alkyl and hydroxy-lower-alkyl.

2. A compound of claim 1 unsubstituted on the benzenoid, chalcogen heterocyclic and azaheterocyclic rings.

3. A compound of claim 2 wherein $m$ is 2 and A is oxygen.

4. A compound of claim 2 wherein $n$ is 2 and A is oxygen.

5. A compound of claim 2 wherein $y$ is 0 and A is oxygen.

6. A compound of claim 2 wherein $m$ is 2 and $y$ is 0.

7. A compound of claim 2, 2-(1-isochromanyl)-2-imidazoline hydrochloride.

8. A compound of claim 1 of the formula

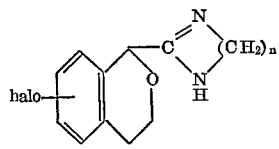

wherein $n$ is an integer from 2 to 4.

9. A compound of claim 1 of the formula

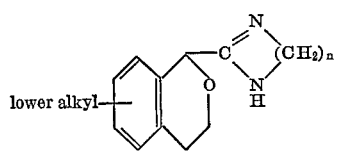

wherein $n$ is an integer from 2 to 4.

10. A compound of claim 1 of the formula

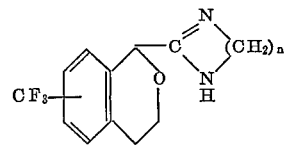

wherein $n$ is an integer from 2 to 4.

11. A compound of claim 1 of the formula

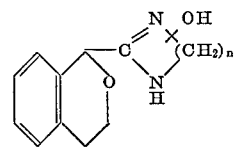

wherein $n$ is an iteger from 2 to 4.

12. A compound of claim 1 of the formula

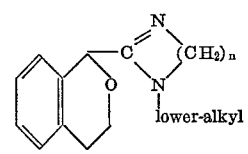

wherein $n$ is an integer from 2 to 4.

13. A compound of claim 1 of the formula

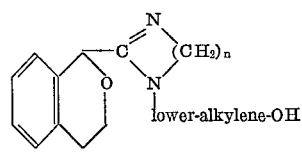

wherein $n$ is an integer from 2 to 4.

14. A compound of claim 1 of the formula

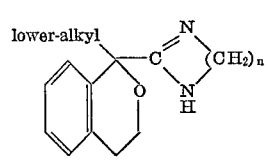

wherein $n$ is an integer from 2 to 4.

15. A compound of claim 1, 2-(1-isothiochromanyl)-2-imidazoline hydrochloride.

References Cited

UNITED STATES PATENTS 2,979,511 4/1961 Krapcho et al. _____ 260—309.6
3,330,838 7/1967 Augstein et al. _____ 260—309.6

FOREIGN PATENTS 951,989 3/1964 Great Britain.

HENRY R. JILES, Primary Examiner.

NATALIE TROUSOF, Assistant Examiner.

U.S. Cl. X.R.

204—158; 252—391, 402; 260—141, 247.1, 247.5, 251, 256.4, 256.5, 293.4, 294, 294.3, 294.7, 327, 330.5, 345.2, 346.2, 73, 475, 518, 556, 599, 612, 618, 650, 784, 791, 999